United States Patent
Miyata

(10) Patent No.: US 11,111,963 B2
(45) Date of Patent: Sep. 7, 2021

(54) TRANSPORT JIG AND TRANSPORT METHOD FOR DOUBLE-ROW SELF-ALIGNING ROLLER BEARING

(71) Applicant: NTN CORPORATION, Osaka (JP)

(72) Inventor: Natsumi Miyata, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/560,165

(22) Filed: Sep. 4, 2019

(65) Prior Publication Data
US 2019/0390716 A1 Dec. 26, 2019

Related U.S. Application Data

(63) Continuation of application No. PCT/JP2018/008357, filed on Mar. 5, 2018.

(30) Foreign Application Priority Data

Mar. 9, 2017 (JP) .............................. JP2017-044695
Feb. 13, 2018 (JP) .............................. JP2018-022668

(51) Int. Cl.
*F16C 41/04* (2006.01)
*F16C 19/38* (2006.01)
*F16C 23/08* (2006.01)

(52) U.S. Cl.
CPC .............. *F16C 41/04* (2013.01); *F16C 19/38* (2013.01); *F16C 23/08* (2013.01)

(58) Field of Classification Search
CPC ........ F16C 19/38; F16C 23/08; F16C 23/086; F16C 35/06; F16C 41/04; F16C 43/04; F16C 41/045
See application file for complete search history.

(56) References Cited

U.S. PATENT DOCUMENTS 3,080,964 A * 3/1963 Robinson ............... B65D 85/58
206/303
10,135,315 B2 11/2018 Angelis et al.
(Continued)

FOREIGN PATENT DOCUMENTS

CN 106015367 A 10/2016
IN 2713/DELNP/2015 9/2015
(Continued)

OTHER PUBLICATIONS

Chinese Office Action dated Mar. 26, 2020, in corresponding Chinese Patent Application No. 201880014779.9 (13 pages).
(Continued)

*Primary Examiner* — James Pilkington

(57) ABSTRACT

Provided is a transport jig to be packed together with a double-row self-aligning roller bearing having an intermediate flange when the double-row self-aligning roller bearing is transported. The transport jig is formed in a ring shape having inner and outer diameters that allow the transport jig to be radially accommodated between an outer circumferential surface of an end portion of an inner ring and an inner circumferential surface of an end portion of an outer ring of the double-row self-aligning roller bearing, has a shape such that one side surface of the transport jig comes into contact with an end surface of each rolling element of the double-row self-aligning roller bearing and another side surface of the transport jig protrudes beyond end surfaces of the inner and outer rings, and is formed from a material softer than the rolling elements.

7 Claims, 4 Drawing Sheets

(56) References Cited

U.S. PATENT DOCUMENTS

2016/0254725 A1    9/2016   Angelis et al.
2016/0290404 A1   10/2016   Wendeberg

FOREIGN PATENT DOCUMENTS

| JP | 2005-350142 | 12/2005 |
|---|---|---|
| JP | 2006-90357 | 4/2006 |
| JP | 2007-119014 | 5/2007 |
| JP | 4977332 B2 | 7/2012 |
| WO | WO 2014/054149 A1 | 4/2014 |
| WO | 2015/069169 A1 | 5/2015 |

OTHER PUBLICATIONS

English Translation by WIPO of the International Preliminary Report on Patentability dated Sep. 19, 2019 in corresponding International Patent Application No. PCT/JP2018/008357.
International Search Report dated May 22, 2018 in corresponding International Patent Application No. PCT/JP2018/008357.
Extended European Search Report dated Nov. 6, 2020, in European Patent Application No. 18764787.0.
Office Action dated Oct. 26, 2020, in Chinese Patent Application No. 201880014779.9 (12 pages including translation).
Chinese Office Action dated Mar. 31, 2021, in Chinese Patent Application No. 201880014779.9, 8 pages including translation.
Indian Office Action dated Apr. 20, 2021, in Indian Patent Application No. 201917038995, 7 pages.

* cited by examiner

TRANSPORT JIG AND TRANSPORT METHOD FOR DOUBLE-ROW SELF-ALIGNING ROLLER BEARING

CROSS REFERENCE TO THE RELATED APPLICATION

This application is a continuation application, under 35 U.S.C. § 111(a), of international application No. PCT/JP2018/008357, filed Mar. 5, 2018, which claims priority to Japanese patent application No. 2017-044695, filed Mar. 9, 2017, and Japanese patent application No. 2018-022668, filed Feb. 13, 2018, the disclosures of all of which are incorporated by reference in their entirety into this application.

BACKGROUND OF THE INVENTION

Field of the Invention

The present invention relates to a transport jig and a transport method that prevent rolling elements from being damaged due to vibration or the like when a double-row self-aligning roller bearing is transported, and particularly relates to a transport jig and a transport method for a double-row self-aligning roller bearing that are also applicable to the case of a large double-row self-aligning roller bearing.

Description of Related Art

A large self-aligning roller bearing for use in a wind power generator or the like is transported in an assembled state. Since gaps are present between rolling elements and inner and outer rings, the assembled state is a state where the rolling elements are movable during transportation of the self-aligning roller bearing. For example, an assembly consisting of the inner ring and the rolling elements may move relative to the outer ring. When this movement is repeatedly caused by vibration of a vehicle or the like during transportation, damage such as fretting may occur.

As a transportation technology capable of preventing damage to a self-aligning roller bearing that does not include an intermediate flange, Patent Document 1 mentions ring-shaped jigs called separators whose clearance is managed, and a method for packing the bearing and the jigs together. This document also describes a method of adding a rolling element presser to each ring-shaped jig and fixing the bearing with a retainer, the rolling elements, and the jig.

RELATED DOCUMENT

Patent Document

[Patent Document 1] JP Laid-open Patent Publication No. 2006-90357

SUMMARY OF THE INVENTION

Although the technology of Patent Document 1 is capable of preventing vibration during transportation to prevent damage, since clearance management is required, it is necessary to produce ring-shaped jigs for each product model number. In addition, a method of interposing a film or the like between the rolling elements and the raceways of the inner and outer rings is also conceivable, but there is a possibility that the film or the like will remain as foreign matter in the bearing when a package is removed at a customer's premise.

An object of the present invention is to provide a transport jig and a transport method for a double-row self-aligning roller bearing that can prevent damage due to movement of rolling elements during transportation, that can be used for a plurality of types of bearings without requiring clearance management, and with which there is no possibility of foreign matter remaining in the bearing.

A transport jig for a double-row self-aligning roller bearing of the present invention is a transport jig to be packed together with the double-row self-aligning roller bearing having an intermediate flange when the double-row self-aligning roller bearing is transported, in which the transport jig is formed in a ring shape having an inner diameter and an outer diameter that allow the transport jig to be radially accommodated between an outer circumferential surface of an end portion of an inner ring of the double-row self-aligning roller bearing and an inner circumferential surface of an end portion of an outer ring of the double-row self-aligning roller bearing, and has a shape such that one side surface of the transport jig comes into contact with an end surface of each rolling element of the double-row self-aligning roller bearing and another side surface of the transport jig protrudes beyond end surfaces of the inner ring and the outer ring, and the transport jig is formed from a material that is softer than the rolling elements.

According to this configuration, by placing the ring-shaped transport jig on the end surfaces of the rolling elements and packing the double-row self-aligning roller bearing together with the transport jig, the rolling elements are pressed against the intermediate flange, and movement of the rolling elements is prevented by contact of the intermediate flange, the rolling elements, and the transport jig. Thus, clearance management becomes unnecessary, and handling with the jig having a simple structure is enabled. In addition, the jig can be used for a plurality of types of double-row self-aligning roller bearings as long as the jig is adapted to the radial dimensions of the bearings. Furthermore, there is no possibility of foreign matter remaining in the bearing.

The material of the transport jig of the present invention may be a rubber or a resin. If the material of the jig is a rubber or a resin, the jig is softer than the rolling elements, so that there is no possibility of damaging the rolling element by the jig.

A transverse cross-sectional shape of the transport jig of the present invention may be a trapezoid that has a longer base on a radially inner side. In the present specification, the "transverse cross-sectional shape" of the transport jig is a cross-sectional shape when the transport jig is cut along a plane including the axis of the bearing and viewed.

The outward facing end surfaces of the rolling elements of the double-row self-aligning roller bearing are each a surface inclined such that the bearing radially inner side thereof is located at the center side in the bearing width direction with respect to the bearing radially outer side thereof. Thus, if the transverse cross-sectional shape of the jig is a trapezoid that has a longer base on a radially inner side, the jig can come into contact with the rolling elements along the inclined end surfaces of the rolling elements to press a wide range of the end surfaces of the rolling elements, so that the pressing state is stabilized.

The transverse cross-sectional shape of the transport jig of the present invention may be a circular shape or an elliptical shape in a normal state. In the present specification, the "normal state" refers to a state where no object is in contact with the transport jig and the transport jig is not deformed. In the case of this configuration, the transport jig deforms so as to conform to the inclined end surfaces of the rolling elements and presses the rolling elements. Thus, the transport jig can stably press the rolling elements. When the transverse cross-sectional shape of the transport jig is a circular or elliptical shape, a material that is soft to some extent is preferable in order to cause deformation as described above.

Whether the transport jig is made into the trapezoid or the circular or elliptical shape may be selected as appropriate in accordance with the size or the shape of the double-row self-aligning roller bearing.

The transverse cross-sectional shape of the transport jig of the present invention may be a circular shape in a normal state, and the following formula (1), formula (2), formula (3), and formula (4) may be satisfied, $$L2-f(x) \geq 0 \qquad \text{formula (1)}$$

$$L2 = r/\tan\theta + r/(\cos\theta \times \tan) + r - L1 \qquad \text{formula (2)}$$

$$\theta = 90° - \alpha \qquad \text{formula (3)}$$

$$y = f(x) \qquad \text{formula (4)}$$

where r represents a transverse cross-section radius of the transport jig (mm); L1 represents a width dimension of a small flange of the inner ring (mm); L2 represents a distance in an axial direction between an axial end portion of the transport jig and the end surface of the inner ring when the transport jig with the radius r is mounted on a radially outer side of the small flange of the inner ring (mm); a represents an angle of the small flange of the inner ring (°); x represents a load applied per 1 mm of the transport jig (N); and y represents an amount of dimensional change by a load of the transport jig (mm).

In order to more effectively prevent damage to the double-row self-aligning roller bearing, it is effective to press the rolling elements with greater force at a load that does not cause damage at portions where the end surfaces of the rolling elements and the intermediate flange are in contact with each other, and a state where the transport jig protrudes beyond the bearing end surface (the end surfaces of the inner ring and the outer ring) needs to be attained even when the transport jig deforms upon reception of the total bearing weight.

As a result of examination and investigation being conducted for a relation between dimensional change of the transport jig and the bearing weight, when a load applied per 1 mm of the transport jig is denoted by x, the load x and an amount of dimensional change y of the transport jig (hereinafter, sometimes simply referred to as "jig") upon reception of a certain load correlate with each other as follows.

$$y = f(x)$$

When it is assumed that the jig is mounted along the radially outer surface of the small flange of the inner ring of a certain double-row self-aligning roller bearing A, a load $x_A$ applied per 1 mm of the jig and an amount of dimensional change $y_A$ of the jig are as follows.

$x_A$=load (N) received by entire jig/{inner ring small flange outer diameter dimension (mm)+jig diameter (mm)/2}×π

$$y_A = F(x_A)$$

Under this condition, when the total weight of the double-row self-aligning roller bearing A is received by the jig, the jig dimension in the load direction is as follows.

Jig dimension in load direction (mm)=jig dimension under no load (mm)−$y_A$

Moreover, the dimensions of the double-row self-aligning roller bearing and the jig to be used are set as follows.

r: a transverse cross-section radius of the jig (mm)

L1: a width dimension of a small flange of an inner ring (mm)

L2: a distance in the axial direction between an axial end portion of the jig and the end surface of the inner ring when the jig with the radius r is mounted on the radially outer side of the small flange of the inner ring (mm)

α: an angle of the small flange of the inner ring (°)

Under this condition, the following formulas are satisfied.

$$\theta = 90° - \alpha$$

$$L2 = r/\tan\theta + r/(\cos\theta \times \tan) + r - L1$$

Furthermore, by setting the jig dimensions such that L2−f(x)≥0 is satisfied, a state where the end surface of the jig protrudes beyond the end surface of the bearing is attained even when the jig receives the total weight of the bearing. Accordingly, the rolling elements can be pressed with greater force at a load that does not cause damage at portions where the intermediate flange and the end surfaces of the rolling elements are in contact with each other. Therefore, it is possible to more effectively prevent damage to the double-row self-aligning roller bearing.

A transport method for a double-row self-aligning roller bearing of the present invention is a method including: placing the transport jig as claimed in any one of claims 1 to 6 at each of opposite end surfaces of each double-row self-aligning roller bearing such that the transport jig is in contact with the rolling elements; covering the double-row self-aligning roller bearing together with the transport jigs placed at opposite sides with a film-like packaging material over an inner circumferential surface, an outer circumferential surface, and opposite end surfaces of the double-row self-aligning roller bearing; and attaining a state where portions of the transport jigs that protrude beyond the end surfaces of the inner ring and the outer ring are pressed toward a center side in a bearing width direction by the packaging material.

With this method, since the bearing, together with the transport jigs of the present invention, is covered with the film-like packaging material, damage due to movement of the rolling elements during transportation can be prevented, and there is no possibility of foreign matter remaining in the bearing. In addition, the same jig can be used for a plurality of types of bearings.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
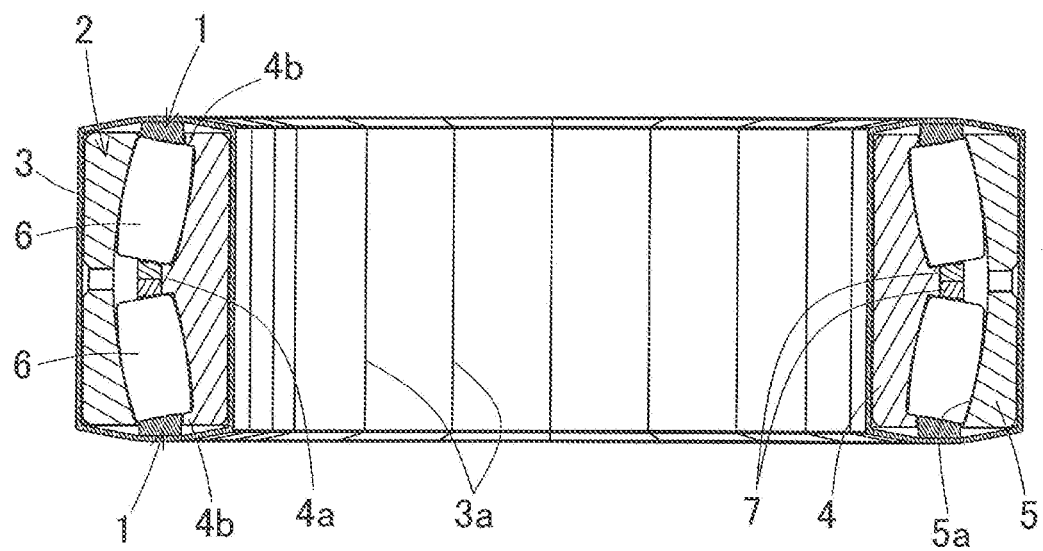
FIG. 1 is a cross-sectional view showing a state where a double-row self-aligning roller bearing is packed by using transport jigs according to a first embodiment of the present invention.
Figure 2:
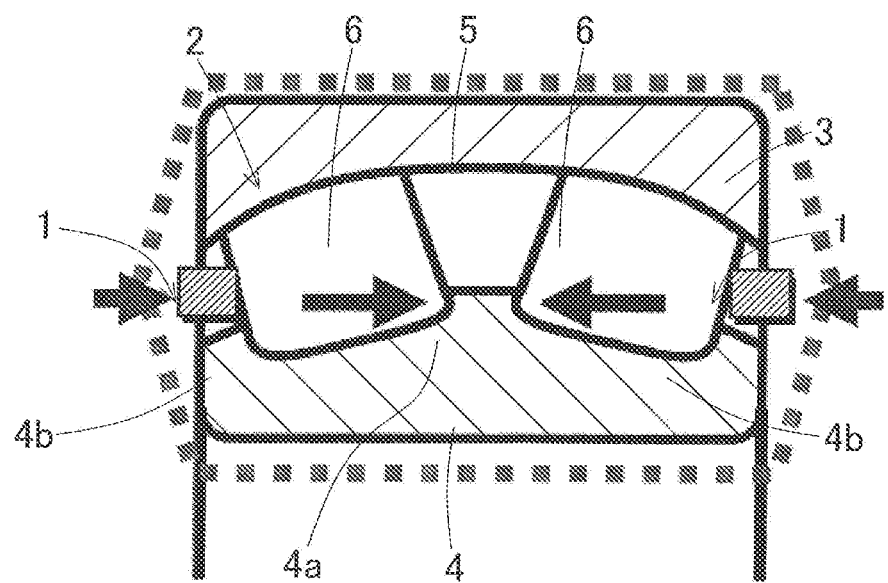
FIG. 2 illustrates action in the packed state.

A first embodiment of the present invention will be described with reference to FIG. 1 and FIG. 2. A transport jig 1 is a jig that is to be packed together with a double-row self-aligning roller bearing 2 by a packaging material 3 when the double-row self-aligning roller bearing 2 is transported. The double-row self-aligning roller bearing 2 to be transported is of a type in which a plurality of rolling elements 6 each composed of a barrel-shaped roller are interposed in two rows between an inner ring 4 and an outer ring 5, the outer ring has a spherical raceway 5a continuous over both rows, and an intermediate flange 4a is provided at the center of the inner ring 4. Small flanges 4b, 4b facing end surfaces of the rolling elements 6, 6 in the respective rows are provided at opposite end portions of the inner ring 4. The rolling elements 6, 6 in the respective rows are retained by a pair of retainers 7, 7 which are disposed such that respective back surfaces thereof contact each other. The retainers 7, 7 for both rows may be integrated with each other to form one retainer. The double-row self-aligning roller bearing 2 is, for example, a bearing to be used as a bearing for a main shaft of a wind power generator, and is a large bearing.

Each of the opposite end portions of the double-row self-aligning roller bearing 2 is attached with one transport jig 1. Each transport jig 1 is formed in a ring shape having an inner diameter and an outer diameter that allow the transport jig 1 to be radially accommodated between an outer circumferential surface of an end portion of the inner ring 4 and an inner circumferential surface of an end portion of the outer ring 5 of the double-row self-aligning roller bearing 2, and has a shape such that one side surface of the transport jig 1 comes into contact with end surfaces of the rolling elements 6 of the double-row self-aligning roller bearing 2 and another side surface of the transport jig 1 protrudes beyond the end surfaces of the inner ring 4 and the outer ring 5.

Each transport jig 1 is formed from a material that is softer than the rolling elements 6. Specifically, the transport jig 1 is, for example, an integrally molded article formed from a rubber or a resin material such as various synthetic resins. In this example, a cross-sectional shape of the transport jig 1 is a non-isosceles trapezoid that has a longer base on the radially inner side extending toward the inner side in the bearing width direction (the center side in the axial direction). The degree of inclination of an oblique side of the trapezoid is equal to the degree of inclination of the end surfaces of the rolling elements 6 in a reference state of the transport jig 1 to be transported.

A transport method will be described. The two transport jigs 1 are prepared and are respectively placed on opposite end surfaces of the double-row self-aligning roller bearing 2 in a state where the transport jigs 1 are in contact with the rolling elements 6 at radial positions corresponding to those of the space between the inner ring 4 and the outer ring 5. The double-row self-aligning roller bearing 2, together with the transport jigs 1 at opposite sides, is covered with the packaging material 3 over the inner circumferential surface, the outer circumferential surface, and opposite end surfaces of the double-row self-aligning roller bearing 2. The packaging material 3 is, for example, a resin film such as a vinyl film. The packaging material 3 may have a wide shape or may have a band shape. The packaging material 3 is, for example, wound in a spiral manner. In FIG. 1, lines indicated by reference numeral 3a indicate the edges of respective layer portions of the packaging material 3 wound on the double-row self-aligning roller bearing 2 and the transport jigs 1. By covering the double-row self-aligning roller bearing 2 and the transport jigs 1 in this manner, a state where portions of the transport jigs 1, 1 at opposite sides that protrude beyond the end surfaces of the inner ring 4 and the outer ring 5 are pressed toward the center side in the bearing width direction by the packaging material 3, is attained.

With the transport jigs 1 having the above described configuration, the following advantages can be obtained. The self-aligning roller bearing 2 is transported in an assembled state. Since gaps are present between the rolling elements 6 and the inner and outer rings 4, 5, the rolling elements 6 are movable during transportation of the self-aligning roller bearing 2 as is, and there is a possibility of occurrence of damage such as fretting. On the other hand, in this embodiment, when packing the double-row self-aligning roller bearing 2 by winding the film-like packaging material 3 on the double-row self-aligning roller bearing 2, the ring-shaped transport jigs 1 are mounted on the end surfaces of the rolling elements 6 and packed together with the double-row self-aligning roller bearing 2, whereby the transport jigs 1 and the double-row self-aligning roller bearing 2 are fixed. By packing the double-row self-aligning roller bearing 2 in this manner, the rolling elements 6 are pressed against the intermediate flange 4a by the transport jigs 1 as conceptually shown with arrows in FIG. 2. Thus, it is possible to fix each rolling element 6 through three-point contact of the transport jig 1, the rolling element 6, and the intermediate flange 4a, so that damage can be prevented.

The outward facing end surfaces of the rolling elements 6 of the double-row self-aligning roller bearing 1 are each a surface inclined such that the bearing radially inner side thereof is located at the center side in the bearing width direction with respect to the bearing radially outer side thereof in a state where the rolling elements 6 are fitted in. Thus, if a transverse cross-sectional shape of each transport jig 1 is a trapezoid that has a longer base on the radially inner side, the transport jig 1 can come into contact with the rolling elements 6 along the inclined end surfaces of the rolling elements 6 to press a wide range of the end surfaces of the rolling elements 6, so that the pressing state can be stabilized.

Other Embodiments

In the following description, parts corresponding to the matters described in the preceding embodiment are designated by the same reference numerals, and the redundant description thereof is omitted. When only a part of a configuration is described, the remaining part of the configuration is the same as that described in the preceding embodiment, unless otherwise specified. The same advantageous effects are achieved by the same configuration. A combination of parts that are specifically described in respective embodiments may be implemented, and, further, embodiments may be partially combined with each other unless such combination causes any problem.

Figure 3:
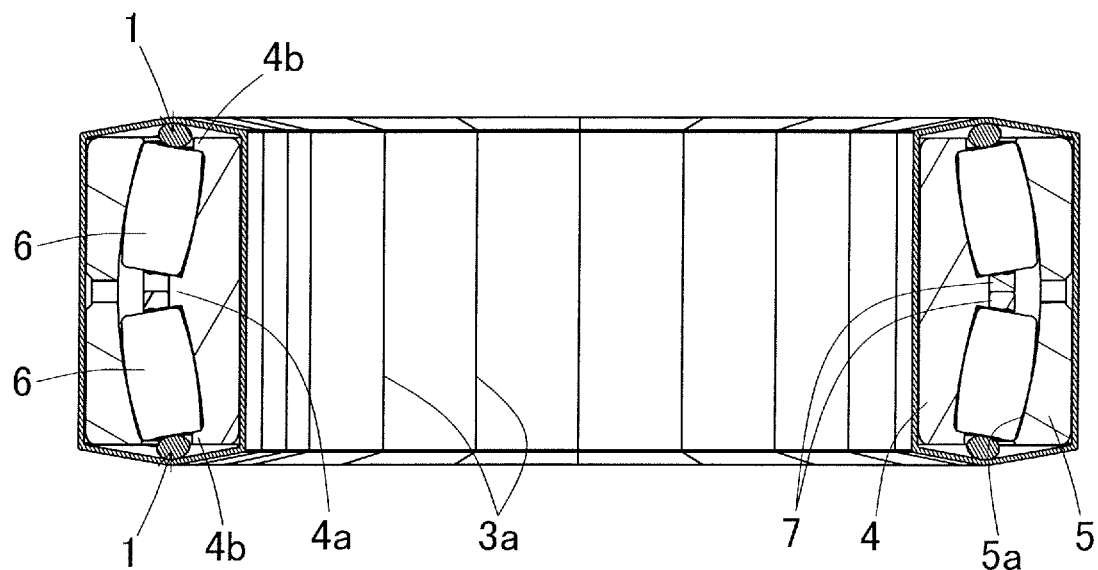
FIG. 3 is a cross-sectional view showing a state where a double-row self-aligning roller bearing is packed by using transport jigs according to another embodiment of the present invention.

FIG. 3 shows another embodiment of the present invention. In this embodiment, the cross-sectional shape of each transport jig 1 in the first embodiment shown in FIG. 1 is made into a circular shape or an elliptical shape in a normal state. The material of each transport jig 1 is a rubber or a resin that is the same as in the first embodiment. As for the hardness of the transport jig 1, the transport jig 1 may be preferably soft enough to conform to the inclination of the end surfaces of the rolling elements 6 in a state where the transport jig 1 is pressed against the rolling elements 6.

In the case of this embodiment, the transport jig 1 deforms so as to conform to the inclined end surfaces of the rolling elements 6 and presses the rolling elements 6. Thus, the transport jig 1 can stably press the rolling elements 6. The other configuration and effects in this embodiment are the same as in the first embodiment.

Figure 4:
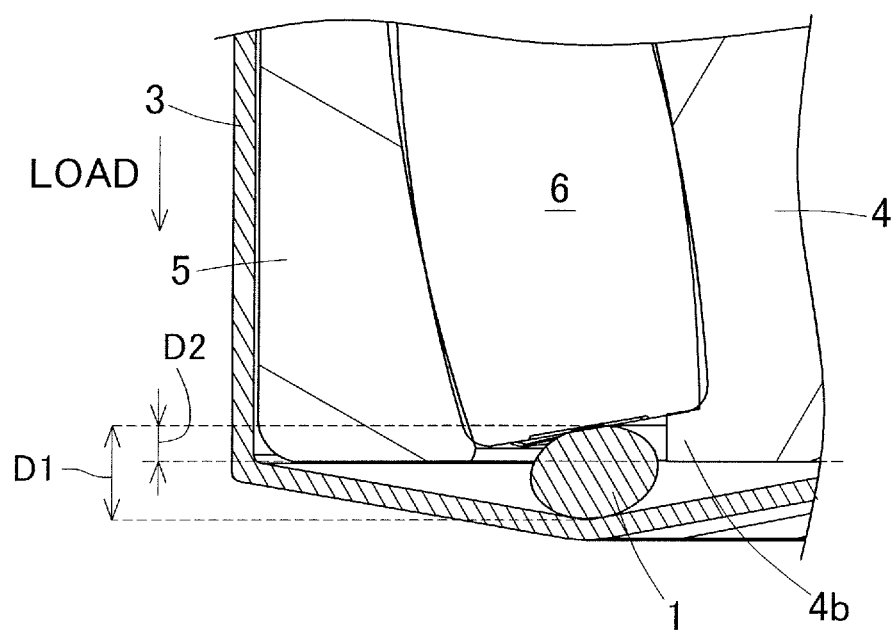
FIG. 4 is an enlarged cross-sectional view showing a relation between dimensional change of the transport jig and the double-row self-aligning roller bearing in an enlarged manner.

FIG. 4 is an enlarged cross-sectional view showing a relation between dimensional change of the transport jig 1 and the double-row self-aligning roller bearing 2 in an enlarged manner. The transverse cross-sectional shape of the transport jig 1 in this example is a circular shape in the normal state.

In order to more effectively prevent damage to the double-row self-aligning roller bearing, it is effective to press the rolling elements 6 with greater force at a load that does not cause damage at portions where the end surfaces of the rolling elements 6 and the intermediate flange 4a are in contact with each other, and a state where the transport jig 1 protrudes beyond the bearing end surface (the end surfaces of the inner ring 4 and the outer ring 5) needs to be attained even when the transport jig 1 deforms upon reception of the total bearing weight. The effect of preventing damage to the double-row self-aligning roller bearing can be exhibited more by satisfying the following formula.

Jig dimension $D1$ in load direction (mm)−dimension difference $D2$ between roller end surface and bearing end surface (mm)$\geq 0$ Therefore, the following examination and investigation were conducted.

[Examination and investigation−relation between jig dimensional change and bearing weight]

A load applied per 1 mm of an annular jig is denoted by x. The load x and an amount of dimensional change y of the jig upon reception of a certain load correlate with each other.

$y=f(x)$

When it is assumed that the jig is mounted along the radially outer surface of the small flange of the inner ring of a certain double-row self-aligning roller bearing A, a load $x_A$ applied per 1 mm of the jig and an amount of dimensional change $y_A$ of the jig are as follows.

$x_A$=load ($N$) received by entire jig/{inner ring small flange outer diameter dimension (mm)+jig diameter (mm)/2}×π

$y_A=F(x_A)$(mm)

In this condition, when the total weight of the double-row self-aligning roller bearing A is received by the jig, the jig dimension in the load direction is as follows.

Jig dimension in load direction (mm)=jig dimension under no load (mm)−$y_A$

Figure 5:
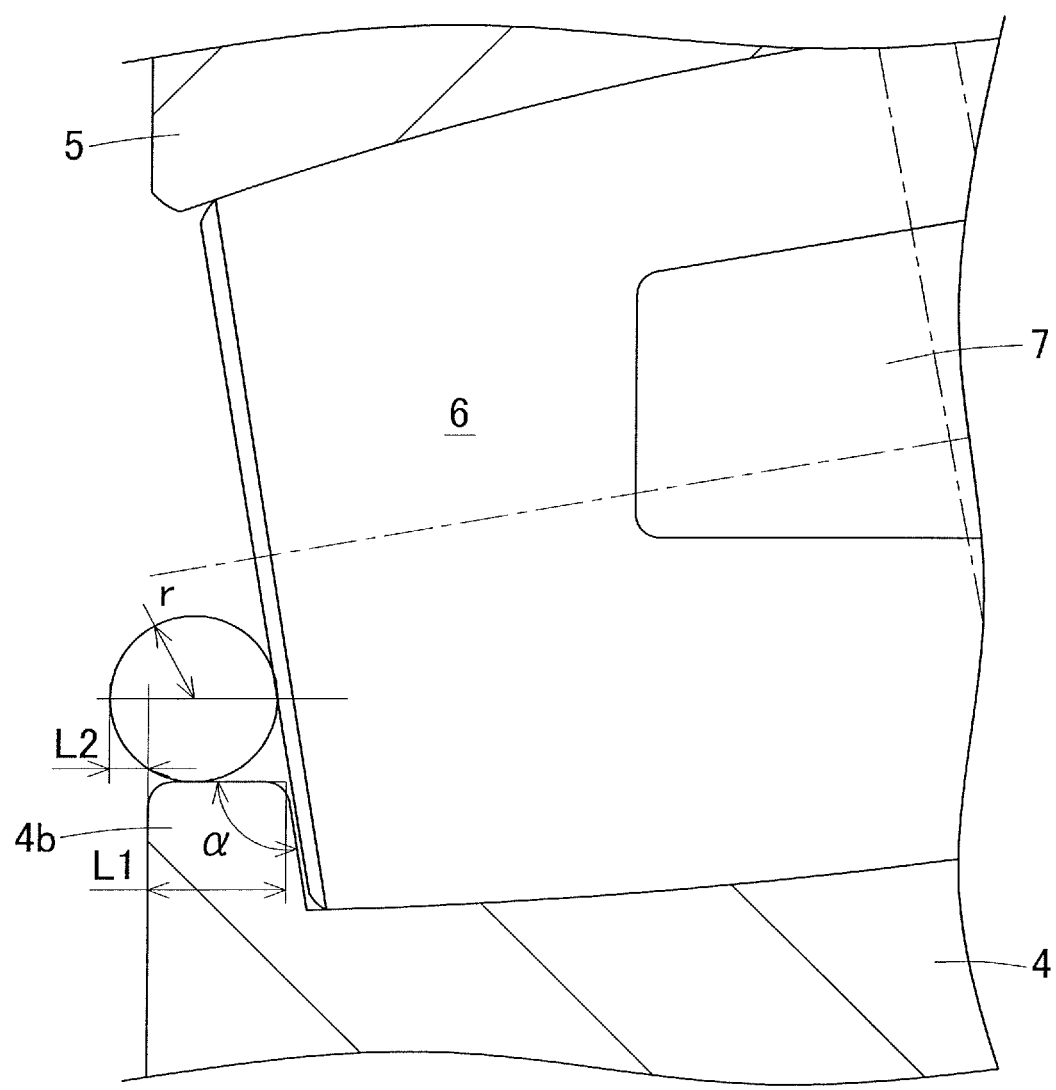
FIG. 5 illustrates a relation between dimensional change of the transport jig and a bearing weight.

Moreover, as shown in FIG. 5, the dimensions of the double-row self-aligning roller bearing and the jig to be used are set as follows.

r: a transverse cross-section radius of the jig (mm)
L1: a width dimension of a small flange of an inner ring (mm)
L2: a distance in the axial direction between an axial end portion of the jig and the end surface of the inner ring when the jig with the radius r is mounted on the radially outer side of the small flange of the inner ring (mm)
α: an angle of the small flange of the inner ring (°)

Under this condition, the following formulas are satisfied.

$\theta=90°-\alpha$ $L2=r/\tan\theta+r/(\cos\theta\times\tan\theta)+r-L1$

Furthermore, by setting the jig dimensions such that $L2-f(x)\geq 0$ is satisfied, a state where the end surface of the jig protrudes beyond the end surface of the bearing is attained even when the jig receives the total weight of the bearing.

Figure 6:
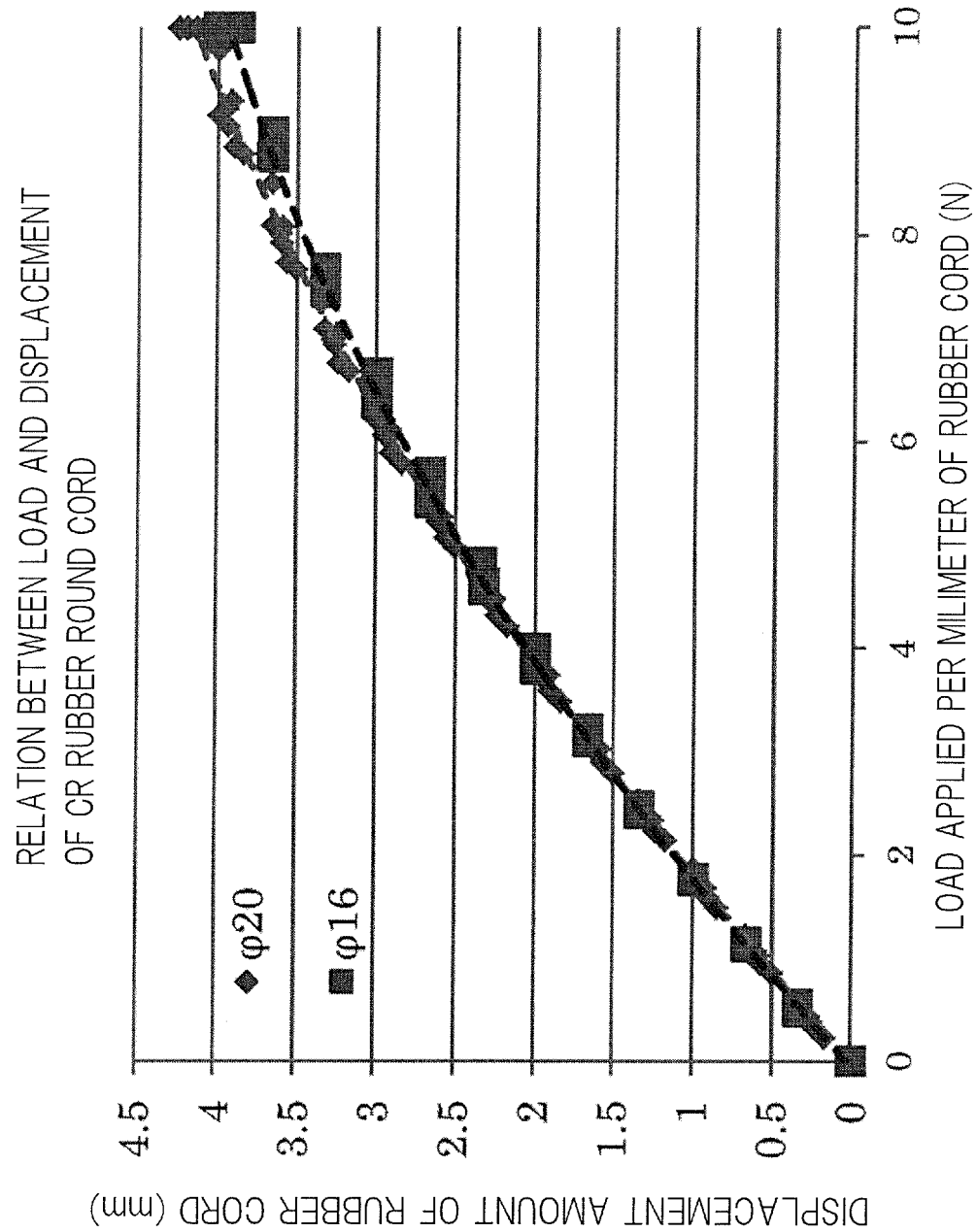
FIG. 6 illustrates a relation between a load and a displacement of the transport jig.

As an example, a rubber round cord made of chloroprene rubber (abbreviated as CR) was used for this jig, and a relation between load and displacement of a φ-20 jig in which a cross-section of a CR rubber round cord has a diameter of 20 mm and a φ-16 jig in which a cross-section of a CR rubber round cord has a diameter of 16 mm was measured. The results are shown in FIG. 6.

Moreover, a certain double-row self-aligning roller bearing A is assumed to have an inner ring small flange outer diameter dimension of 900 mm, an inner ring small flange width dimension of 15 mm, an inner ring small flange angle 10°, and a bearing load of 1500 kg, and the φ-20 jig is used as a jig.

Under this condition, each value is as follows.

$x\approx 5.15, f(x)\approx 2.5, L2\approx 6.9$

Thus, $L2-f(x)\approx 6.9-2.5=4.4\geq 0$ is established, so that a state where the end surface of the jig protrudes beyond the end surface of the bearing is attained even when the jig receives the total weight of the bearing. Accordingly, the rolling elements can be pressed with greater force at a load that does not cause damage at portions where the intermediate flange and the end surfaces of the rolling elements are in contact with each other. Therefore, it is possible to more effectively prevent fretting damage that occurs due to roller vibration during transportation.

[Possibility of Damage When Total Weight of Bearing is Supported Only by Contact Surfaces of Intermediate Flange and Rollers in One Row]

It was examined whether there was a problem in supporting the total weight of the bearing only by the contact surfaces of the intermediate flange and the rollers in one row. When a product is horizontally placed, if a jig is made to protrude beyond the end surface of the bearing even upon reception of the total weight of the bearing, the contact surfaces of the intermediate flange of the inner ring and the roller row that is located at the lower side when the product is horizontally placed support the total weight of the bearing. Surface pressure between the rollers and the intermediate flange in this situation is examined.

The surface pressure P under the condition described above is as follows.

$P$ (MPa)=load($N$)/area (mm$^2$)={total weight of bearing (kg)×gravitational acceleration}/{area of contact between rollers and intermediate flange (mm$^2$)×number of rollers in one row}

The acceptable safety factor of a wind power generator is defined in GL standard such that S0≥2.0. When an acceptable contact surface pressure is estimated from this acceptable safety factor, the acceptable contact surface pressure is approximately 2800 MPa, and thus the surface pressure P needs to satisfy the following.

$P \leq 2800$ MPa

Because of the above two formulas, when the total weight of the bearing is supported only by the contact surfaces of the rollers in one row and the intermediate flange and P=2800 MPa, an area S needs to satisfy the following.

$S_{m,n}$={bearing weight (kg)×gravitational acceleration}/2800 (MPa)≤$S$(mm$^2$)

When the weight of a large double-row self-aligning roller bearing for a windmill is at most 3000 kg, $S_{min}$ is as follows.

$S_{min}$(mm$^2$)≈10.9

When it is assumed that 30 rollers are used in one row of the double-row self-aligning roller bearing, an area S'$_{min}$ of a contact surface with the intermediate flange per one roller is as follows.

$S'_{min}$(mm$^2$)≈10.9/30≈0.36

Meanwhile, when the minimum diameter of the end surface of each roller used in the large double-row self-aligning roller bearing for a windmill is 50 mm, the following is satisfied.

$S'_{min}$≈0.36≤0.39≈0.0002×(area(mm$^2$) of roller end surface with diameter 50 mm)=$S$ Accordingly, when the contact surface of the roller and the intermediate flange has an area not larger than approximately 0.02% of the area of the entire roller end surface, 2800 MPa, which is the acceptable contact surface pressure, is applied, but this is a very low value, so that it can be determined that there is no problem.

Although the modes for carrying out the present invention have been described on the basis of the embodiments, the embodiments disclosed herein are illustrative in all aspects and not restrictive. The scope of the present invention is indicated by the claims, rather than by the above description, and is intended to include any modifications within the scope and meaning equivalent to the claims.

REFERENCE NUMERALS

1 . . . Transport jig
2 . . . Double-row self-aligning roller bearing
3 . . . Packaging material
4 . . . Inner ring
4a . . . Intermediate flange
4b . . . Small flange
5 . . . Outer ring
6 . . . Rolling element
7 . . . Retainer

What is claimed is:

1. An apparatus comprising:
a double-row self-aligning roller bearing having an intermediate flange;
two transport jigs packed together with the double-row self-aligning roller bearing, each transport jig being disposed at each of opposite end surfaces of the double-row self-aligning roller bearing such that each transport jig is in contact with a respective rolling element of a plurality of rolling elements of the double-row self-aligning roller bearing; and
a packaging material in a form of a film that covers the double-row self-aligning roller bearing together with the two transport jigs over an inner circumferential surface, an outer circumferential surface, and the opposite end surfaces of the double-row self-aligning roller bearing,
wherein
each of the two transport jigs is formed in a ring shape having an inner diameter and an outer diameter that allow the transport jig in its entirety to be accommodated, in a radial direction of the double-row self-aligning roller bearing, between an outer circumferential surface of an end portion of an inner ring of the double-row self-aligning roller bearing and an inner circumferential surface of an end portion of an outer ring of the double-row self-aligning roller bearing,
each of the two transport jigs is shaped such that one side surface of the transport jig comes into contact with an end surface of a respective rolling element of the plurality of rolling elements and another side surface of the transport jig protrudes beyond end surfaces of the inner ring and the outer ring in an axial direction of the double-row self-aligning roller bearing, and
each of the two transport jigs is formed from a material that is softer than the plurality of rolling elements of the double-row self-aligning roller bearing.

2. The apparatus as claimed in claim 1, wherein the material is a rubber.

3. The apparatus as claimed in claim 1, wherein the material is a resin.

4. The apparatus as claimed in claim 1, wherein a transverse cross-sectional shape of each of the two transport jigs is a trapezoid that has a longer base on a radially inner side.

5. The apparatus as claimed in claim 1, wherein a transverse cross-sectional shape of each of the two transport jigs is a circular shape or an elliptical shape in a normal state.

6. The apparatus as claimed in claim 1, wherein
a transverse cross-sectional shape of each of the two transport jigs is a circular shape in a normal state.

7. A method for individually packing and transporting a double-row self-aligning roller bearing having a flange, using a plurality of transport jigs, the method comprising:
placing a respective transport jig of the plurality of transport jigs at each of opposite end surfaces of each double-row self-aligning roller bearing such that each of the transport jigs is in contact with a respective rolling element of a plurality of rolling elements of the double-row self-aligning roller bearing, wherein each of the transport jigs is formed in a ring shape having an inner diameter and an outer diameter that allow the transport jig in its entirety to be accommodated, in a radial direction of the double-row self-aligning roller bearing, between an outer circumferential surface of an end portion of an inner ring of the double-row self-aligning roller bearing and an inner circumferential surface of an end portion of an outer ring of the double-row self-aligning roller bearing, and each of the transport jigs is formed from a material that is softer than the plurality of rolling elements of the double-row self-aligning roller bearing;

covering the double-row self-aligning roller bearing together with the transport jigs placed at opposite sides with a packaging material in a form of a film over an inner circumferential surface, an outer circumferential surface, and the opposite end surfaces of the double-row self-aligning roller bearing; and attaining a state where portions of the transport jigs that protrude in an axial direction of the double-row self-aligning roller bearing beyond end surfaces of the inner ring and the outer ring are pressed toward a center side in the axial direction of the double-row self-aligning roller bearing, by the packaging material, wherein each of the transport jigs is shaped such that one side surface of the transport jig comes into contact with an end surface of a respective rolling element of the plurality of rolling elements and another side surface of the transport jig protrudes beyond the end surfaces of the inner ring and the outer ring in the axial direction of the double-row self-aligning roller bearing.

\* \* \* \* \*